3,396,477
AGGLOMERATING APPARATUS

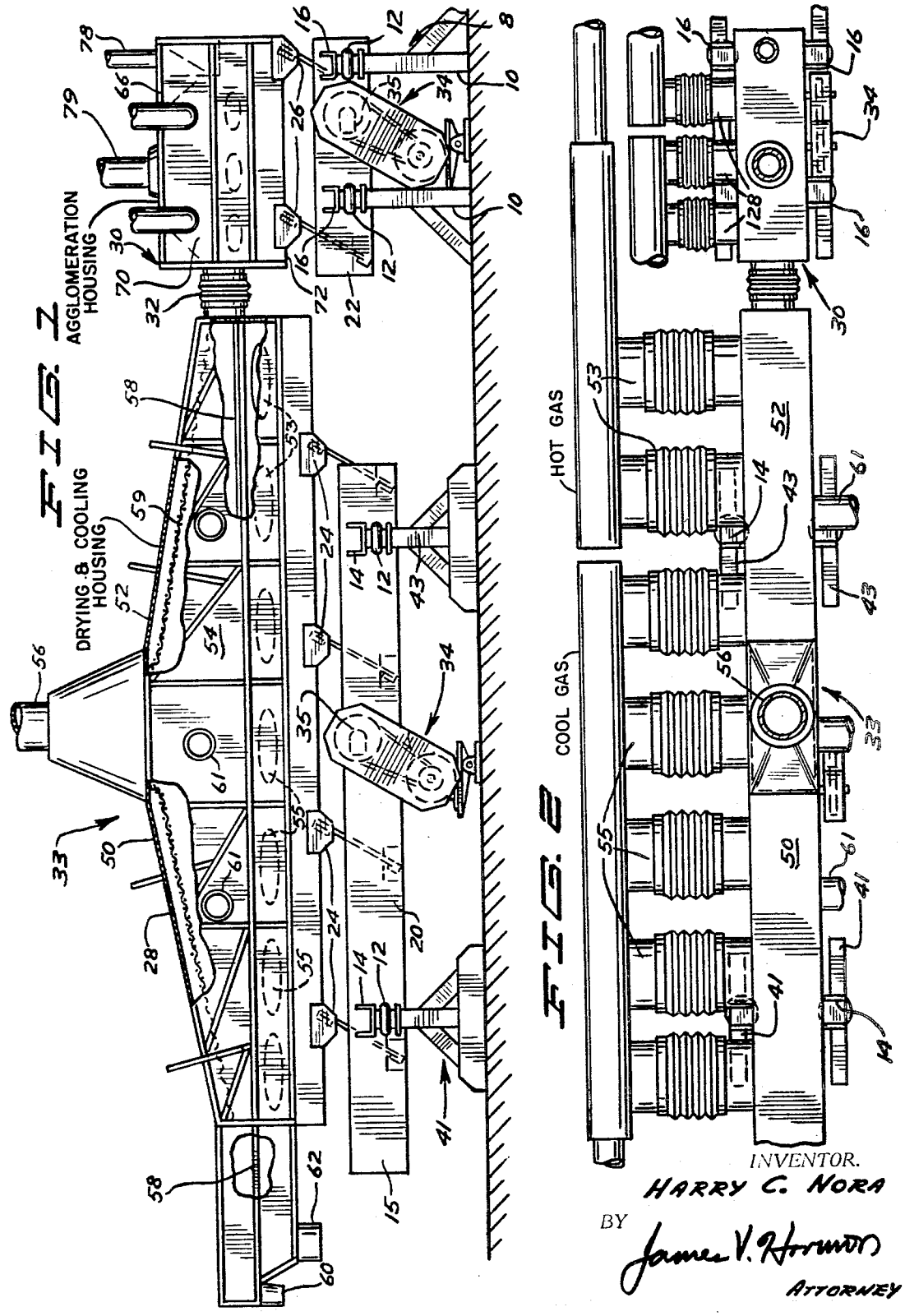

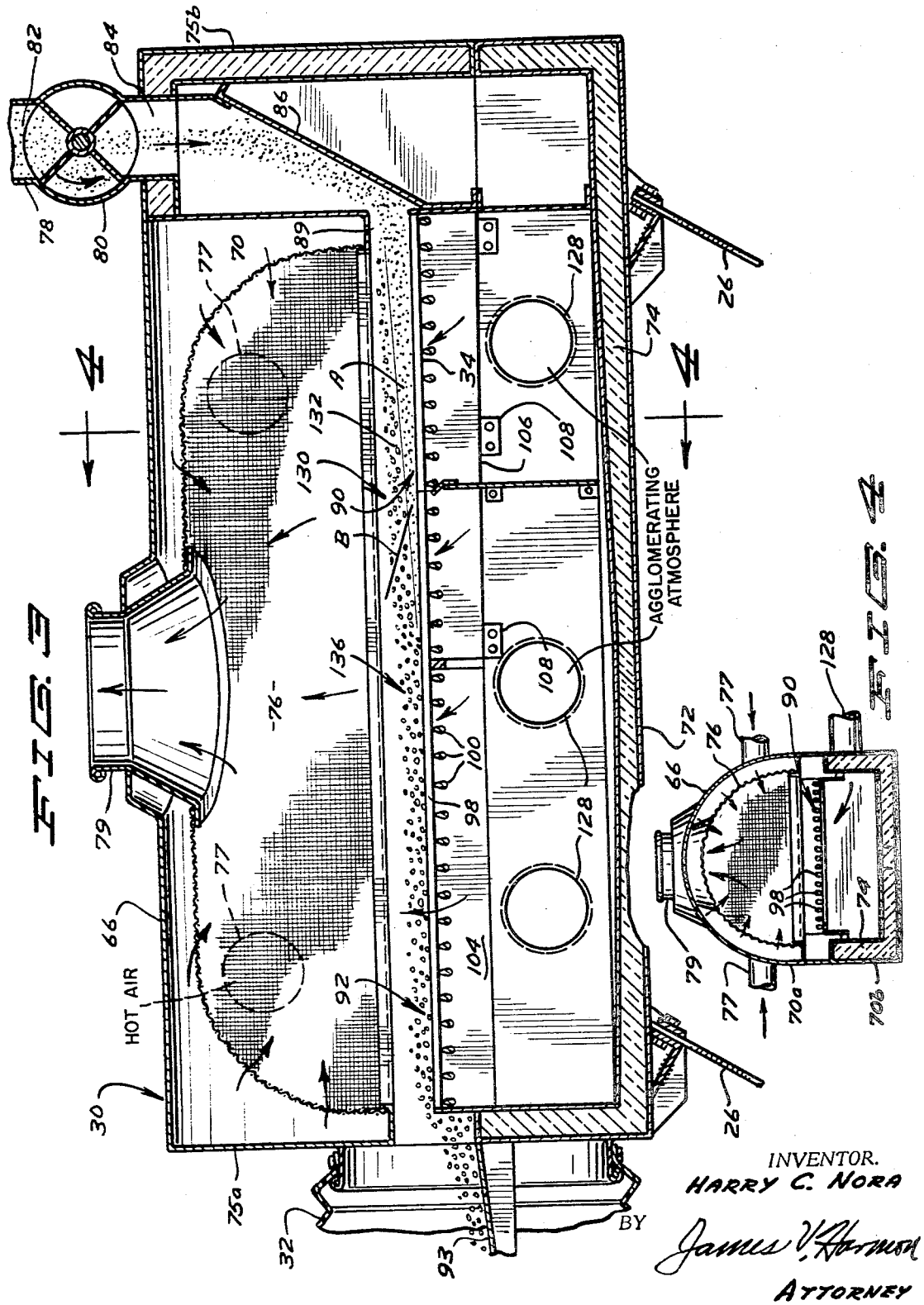

Harry C. Nora, Minneapolis, Minn., assignor to The Pillsbury Company, Minneapolis, Minn., a corporation of Delaware
Filed Nov. 7, 1966, Ser. No. 592,349
12 Claims. (Cl. 34—85)

ABSTRACT OF THE DISCLOSURE

Apparatus for agglomerating particulate material to form porous clusters or agglomerates. The apparatus includes a first foraminous surface for supporting the bed of particles that is to be agglomerated with a duct communicating through the surface to force an agglomerating atmosphere such as heated moist air containing particles of water vapor upwardly through the bed and a second gas diffusion surface above the bed for introducing a protective gas into the upper portion of the agglomerating chamber to provide a gaseous boundary layer for preventing the undesired deposition and build-up of pulverulent material on the inside surface of the apparatus.

---

This invention relates to an apparatus for forming agglomerates from particulate materials. The invention is particularly useful in forming readily soluble or dispersible porous agglomerates from powdered solids.

Of the equipment previously proposed for agglomerating materials, one of the most successful designs includes one or more horizontally disposed linearly arranged screens connected to a motor which imparts vibratory movement to the screens with a provision for feeding pulverulent material onto one end of the vibrating screens and a further provision for forcing moisture or other condensible vapor containing gas (hereinafter referred to as vapor-gas) upwardly through the first of the screens and a fluid drying medium through a succeeding screen.

Although these prior devices have been highly successful for many purposes, materials which agglomerate very easily have a tendency to form sticky or gummy masses on the exposed surfaces of the apparatus and thereby clog ducts as well as screen openings. Not only does the formation of these gummy masses interfere with the production of suitable agglomerates, it also substantially reduces production rates. Moreover, the accumulated masses occasionally break off and become incorporated in the end product. It also necessitates the frequent removal, cleaning and replacement of parts, particularly the screens. This is especially objectionable where the accretion formed on the screens is tough and difficult to remove or consists of a toxic chemical material.

One object of the present invention is the provision of an improved agglomerating apparatus in which the accumulation of deposits within the equipment is substantially reduced.

Another object of the present invention is the provision of an improved agglomerating apparatus wherein the distribution of agglomerating gases in the agglomerating chamber is improved thereby reducing the free flow of dust from the agglomerator.

A further object of the invention is to provide an improved agglomerating apparatus capable of agglomerating products with agglomerating gases having a lower level of humidity than used heretofore.

A still further object of the invention is the provision of an improved agglomerating apparatus wherein the average time that the apparatus can be operated prior to the formation of deposits is substantially extended by making possible the control of the composition, temperature and humidity content of the gas introduced through different portions of the agglomerator enclosure.

Another object of the invention is the provision of an improved agglomerating apparatus in which the flow of agglomerating gas through the agglomerating screen into the bed of product that is to be agglomerated can be reliably maintained at a relatively high velocity.

The advantages of the invention will be apparent from the following specification and claims and the accompanying figures illustrating a preferred form of the invention by way of example.

FIGURE 1 is a side elevational view of an agglomerator and dryer embodying the present invention.

FIGURE 2 is a plan view of the invention.

FIGURE 3 is a longitudinal sectional view of the agglomerator portion of the apparatus on an enlarged scale relative to FIGURES 1 and 2.

FIGURE 4 is a transverse vertical sectional view on a reduced scale of the screen supporting structure and gas flow taken on line 4—4 of FIGURE 3.

The term "agglomeration," in the sense that it is used in the present application, means the formation clusters of relatively small individual particles by allowing particles which have been rendered tacky on their surfaces to make random contact with each other to form a porous lacy reticulum and finally rigidifying the bonds between the particles together at their points of contact. The particles are preferably maintained in random motion with respect to one another within a fluidized bed at the time they are brought into contact. Agglomerates produced in the manner described are characterized by the formation of relatively loosely compacted lacy networks having a fairly high percentage of open space between the bonded particles and they exhibit instant solubility or dispersibility when placed in a liquid. They should be clearly distinguished from balls, pellets, tablets or sintered masses formed by tumbling, rolling, compressing and the like wherein the particles are relatively tightly compacted and strongly bonded to one another, have a smooth surface layer formed from either compressed material or a dried surface layer.

The invention will now be briefly described. In accordance with the present invention there is provided an agglomerating apparatus comprising an enclosure having a pair of foraminous gas diffusion surfaces. The first of these surfaces comprises a horizontal particle support surface for supporting the particles that are to be agglomerated as a relatively thin, generally horizontally disposed bed immediately above it. The second gas diffusion surface forms the top of the enclosure and a flow of gas through the upper gas diffusion surface provides a protective boundary layer over the inner surface of the enclosure to prevent the moistened particulate material from adhering to the walls of the agglomerator. A hood is mounted over the outside of the upper gas diffusion surface and a chamber is defined between the hood and the upper gas diffusion surface. A source of gas is connected to the hood and the gas introduced to the hood passes into the chamber and from the chamber through the upper gas diffusion surface to provide a protective boundary layer of gas on the inside of the enclosure. The flow of gas through the foraminous supporting surface causes particles of material fed to the agglomerator to become moistened and to adhere together at their points of contact. In accordance with a preferred form of the invention at least the horizontal supporting diffusion surface is vibrated for imparting random vibratory movement to the particles in the bed.

By the term "foraminous" is meant having openings of sufficient size to allow the passage of gas therethrough. The openings in the upper gas diffusion surface may vary in size considerably. Thus, a foraminous member can comprise a screen formed from woven wire, sintered metal or a variety of other materials. The openings can be round, square or have the form of elongated slots or in the case of a sintered material can comprise pores extending between the bonded particles.

The porosity of the upper gas diffusion surface can be varied considerably and is not considered critical provided the pores are small enough so that the flow of gas into the agglomeration zone is fairly uniform. To prevent the flow of boundary layer gas into the agglomerator only at points where the gas is introduced through the hood, it is preferred that a slight back pressure be present within the chamber, i.e. a slight pressure differential should exist across the upper diffusion surface. In this way flow through all parts of the upper gas deffusion surface will be relatively uniform and accordingly the boundary layer will be uniformly distributed thereby preventing the unwanted deposition of moistened pulverulent material at any point on the screen. While many pervious materials can be used to form the upper gas diffusion surface, a woven screen such as a knitted wire screen of 20 by 200 mesh and consisting of .010 mesh wire on one side and .0095 inch wire on the other side was found satisfactory. The openings in this screen were about .007 inch in average diameter.

A superheated vapor or "gaseous mixture" containing a superheated vapor passes upwardly through the permeable supporting medium or screen of the apparatus to render the surfaces of the particles tacky. The vapor preferably contains a gas which, in this specification and the appended claims, means an essentially inert gas that serves as a carrier mixed with a condensible agglomerating vapor, although in some cases no diluting gas is necessary. This vapor is hereinafter referred to as vapor-gas. The vapor-gas transfers heat to the solids being treated and preferably provides the force necessary to fluidize or sufficiently agitate the bed of solids to cause the solid particles to be partially suspended and dispersed in the bed. The inert gas acts as a diluent for the condensible vapor and the proportion of inert gas in the mixture determines the saturation point of the mixture. The requisite inert gas in most cases is not condensible or absorbable on the surfaces of the particles being agglomerated within the range of temperatures employed and is inert toward the material being treated. Vapor, which is either condensible or absorbable on the surfaces of the particles being agglomerated within the range of temperatures employed causes adhesive films to be formed so that particles will adhere together. The vapor is introduced into the gas to provide a gas-to-vapor ratio which, within the range of temperatures employed, will result in surface condensation and/or absorption of the vapor upon the particles in the upper zone or strata of the bed of moving particles.

In this specification and appended claims the "vapor-gas" consists either of condensible vapors alone in a superheated condition or of said superheated and condensible vapors admixed with the substantially non-condensible carrier gas.

Where herein and in the appended claims the term "fluidization" is used, the broad significance of that term is intended to include not only the state or condition which is known in the process industries as "fluidization" of pulverulent solids, but also a condition where the solid particles are partially suspended in the gaseous mixture by mechanical agitation, vibration or other means to an extent necessary to cause them to flow in much the same manner as a liquid.

The apparatus is described and illustrated in more detail hereinbelow by reference to the figures. It will be noted that the uniformly introduced pulverulent material is fluidized into the form of a bed which is caused to travel through a predetermined, generally horizontal path in the apparatus illustrated. The superheated vapor-gas supplied from the lower chamber flows upwardly through the permeable supporting medium or screen and through the moving bed thereabove, and is initially maintained at a temperature considerably above the saturation temperature of the vapor-gas utilized as will later be indicated from the ranges of temperature expressed in this application. In said upward flow of vapor-gas, the superheat is dissipated by the underlying or inner layer of the bed of fluidized powder and heats the same until after dissipation of the superheat, condensation occurs in the upper portion of the moving bed and preferably in a stratum of a thickness of several times the thickness of the dry underlayer, as will be discussed more fully in connection with FIGURE 1 below. The condensate on the surfaces of the particles causes said surfaces to become softened and adherent so that agglomeration proceeds in the said upper zone with the rapid agitation and dispersion of particles effected through continued fluidization of the moving bed of material.

It is preferred that the temperature of superheat of the vapor is sufficiently above the saturation point of the vapor-gas to prevent condensation and/or absorption of the agglomerating vapor close to or on the porous medium or screen.

A variety of procedures can be followed by transferring the material through the apparatus including for example, vibration, moving belts, gravity and the like. Vibration can be used to help disperse the particles.

The dispersion and agitation of the solid particles (powdered and initial agglomerates) and the efficiency of agglomeration carried out in the first treatment section and in the second or drying treatment section are substantially enhanced by the rapid, short-stroke vibration of the apparatus preferably including the vibration of the permeable supporting medium or screens in a direction that is the resultant of two forces, one parallel to the direction of travel and one normal to surface of the screen. If in the agglomerator certain of the discrete powder particles or adhered pluralities of particles in the upper stratum carrying adhesive surface films move downwardly in the resulting dispersion, the same encounter dry heated particles disposed therebelow and pick up numbers thereof in their subsequent general longitudinal travel.

The pervious supporting members or screens can be formed from any of a variety of materials which are permeable to agglomerating gases but metal bars or the like are particularly advantageous since they are rigid and therefore tend to wear less than the flexible glass cloth screens previously used.

While metal screens are specified by way of example, it should be understood that the screens can be formed from other materials such as glass, ceramic or polytetrafluoroethylene. The latter materials are preferred for use with highly corrosive materials.

The apparatus according to the invention has been found suitable for agglomerating a wide variety of materials with little tendency for fouling to occur. It is characterized by reliable performance for long periods of time and by the production of a more uniform product.

Refer now to FIGURES 1–4 with reference to one preferred form of the invention. The agglomerator includes a housing 30 having a product inlet at the right end and a product outlet at the left end. Vibratory movement used by way of example for transferring the particles through the apparatus is imparted to housing 30 by means of a suitable vibrator such as motor operated vibrator 34. The agglomerator 30 is supported upon a framework 8 comprised of four upright members 10, only two of which are shown. At the top of the uprights 10 are mounted hollow air-filled rubber support members 12. Resting upon the upper surface of the supports 12 are four horizontally disposed brackets 16 affixed to the sides of a horizontally disposed elongated frame member 22. Extending upwardly on an inclined axis to the right as seen in FIGURE 1 is a pair of resilient suspension members 26, the upward ends of which are affixed to the lower portion of the agglomerator 30. The vibrator 34 can be of any suitable construction but a vibrator including an eccentric such as an eccentric weight 35 has been found satisfactory.

The drying and cooling housing 33 which will be described in more detail hereinbelow is supported for vibratory movement in the same manner as the agglomerator 30. Accordingly, there is provided a pair of stands 41 and 43 to the upward ends of which are affixed resilient elements 12. Horizontally extending brackets 14 are mounted upon the elements 12. A longitudinally extending frame member 15 is supported upon the brackets 14. A plurality of resilient mounted members 24 are secured to the frame member 15. The members 24 can be composed of Fiberglas or steel and may have the same construction as the members 26. The upward ends of the members 24 are secured to the lower surface of the housing 33. Vibration is imparted to the frame member 15 by means of another motor and eccentric weight 34 in the same manner as the agglomerator.

The agglomerator housing 30 includes a curved top wall or hood 66, side walls 70 and bottom wall 72. The side walls 70 of the housing are divided into an upper section 70a and lower section 70b (FIGURE 4) which can be separated from one another when the agglomerator housing is to be opened. The bottom wall 72 and walls 70b consist of two spaced layers of sheet metal separated by a suitable insulating material 74 such as heat resistant foamed plastic insulation. The agglomerator housing 30 includes end walls 75a and 75b. Spaced somewhat from the inner surface of the hood 66 is a gas diffusion surface composed of a screen 76. Air passing into the agglomerator through the screen 76 forms a boundary layer on the inside surface thereof. The boundary layer gas is introduced through lateral inlet ducts 77 as seen in FIGURES 3 and 4. As can also be seen in FIGURES 3 and 4, an outlet duct 79 is connected to the top center portion of the screen 76. Accordingly, the gas present within the agglomerating apparatus including the boundary layer gas introduced through screen 76 is exhausted through the duct 79. Toward the right of the outlet duct 79 as seen in FIGURE 3 is a product inlet duct 78 provided with a star valve 80 for introducing pulverulent material 82 that is to be agglomerated.

The pulverulent material 82 passes downwardly during operation from valve 80 through a duct 84 and onto an inclined chute or ramp 86. The material falling downwardly over the chute 86 passes through an inlet opening 89 into the agglomerator housing 30 and onto an agglomerating screen 90 and a pre-drying screen 92. At the downstream end of the screen 92 is provided a ramp 93 extending horizontally through a sleeve 32 for conveying the freshly agglomerated material to a dryer of any suitable and conventional construction.

The agglomerating screen 90 and the drying screen 92 comprise a plurality of longitudinally extending spaced apart bars 98 affixed to transverse bars 100, the latter being rigidly secured as by welding to identical parallel side plates 104, one of which is shown in FIGURE 1.

The agglomerator 30 is also provided with a plurality of longitudinally spaced laterally extending inlet ports 128, the one at the right being connected to a source of an agglomerating atmosphere and the other two being connected to a source of drying gas such as heated air. The screens 90 and 92 can, if desired, be coated with a non-adherent substance such as polytetrafluoroethylene. The agglomerating atmosphere introduced through the port 128 at the right will now be described.

In a preferred form of the invention, the agglomerating atmosphere consists of a mixture of a carrier gas and water vapor either with or without moisture present in the form of suspended droplets. Another form of agglomerating gas consists of a carrier gas without water vapor heated to a temperature sufficient to produce incipient fusion of the particles of pulverulent material which are to be agglomerated. In this instance, the agglomerating gas consists of heated dry air so that the pulverulent material during the agglomeration process becomes heated to the point where the surfaces thereof are tacky and adhere together when the particles contact each other. The boundary layer gas introduced through ducts 77 can have the same or different composition from the agglomeration gas. It can consist, for example, of hot dry air.

The combination drying and cooling housing 33 will now be described in connection with FIGURES 1 and 2. As seen in the figures, the housing 33 includes upwardly and centrally inclined top wall portions 50 and 52, parallel side walls 54 and a central and upwardly extending outlet duct 56. Within the housing 33 is a horizontally disposed elongated gas diffusion surface such as a screen 58 as seen in FIGURE 1. Spaced inwardly from the top wall portions 50 and 52 is a second gas diffusion surface such as a screen 59. A plurality of ducts 61 are connected to the upper portion of wall 54 to supply a gas to the housing 33 which will flow during operation through the screen 59 into the space between screen 59 and screen 58. During operation, a relatively hot, dry gas such as heated air is introduced through ducts 53 to dry the agglomerated particles which pass from right to left as seen in the figures on the upper surface of the screen 58. A relatively cool gas is introduced through a plurality of ducts 55 to cool the agglomerates. These gases pass upwardly through the screen 58 and are exhausted through the duct 56. Before these gases are exhausted they are mixed with the gas introduced through the screen 59. The agglomerates are exhausted through outlet ports 60 and 62 as seen in FIGURE 1. The gas passing through the screen 59 reliably prevents deposition of material and helps to reduce the amount of expelled dust as well as providing other benefits described in connection with the agglomerator 30.

The operation of the agglomerate 30 will now be described. To begin the process, both of the vibrators 34 are placed in operation and adjusted to produce vibration of the required frequency and stroke length. The agglomerating atmosphere and drying gas are fed through the ducts 128. A gas of any desired composition and temperature is introduced through the ducts 77. The drying gas can comprise, for example, heated dry air.

The star valve 80 is then operated causing the pulverulent material that is to be agglomerated to fall downwardly across the chute 86. As the pulverulent material falls downwardly from the chute, it passes first over the right end of the agglomerator screen 90. As the pulverulent material flows over the screen 90, it will be placed in a condition of random vibration which acting together with the air introduced from below form a fluidized bed 130 including a portion 132 which consists of a mixture of agglomerated particles and unagglomerated particles above a line designated A. Below line A is a portion consisting entirely of unagglomerated particles. Beyond a line designated B, the fluidized bed 130 will consist of a portion 136 comprised almost entirely of agglomerated bodies. These agglomerated bodies will pass toward the left as seen in FIGURE 1 over screen 92 where the agglomerates will be partially dried. They will pass onto the ramp 93 and into the drying and cooling apparatus 33 in the event further drying is required.

While the vibration imparted to the support screen of the agglomerator has been described as inclined linear vibration, the direction and slope of the vibration can be changed as desired from horizontal linear motion to linear motion sloped downwardly in the direction of travel of the particles or linear vibratory motion sloped upwardly in the direction of the particles as they travel over the screen. Gas or air passing through the supporting screen at the node points does not support the particles of the product in suspension and accordingly more of the product becomes deposited at these points than at other points of the agglomerator screen. By adjusting the slope of the direction of vibration in this manner it is possible to reduce or eliminate the impact of the particles against the screen or at node points on the screen which are characterized by the presence of a product build-up.

It was found that the possibility of introducing an agglomerating gas through the upper part of the inclosure, that is, through the upper gas diffusion surface 76, provided a better distribution of the agglomerating atmosphere in the agglomerating chamber thereby reducing the free dust flow out of the apparatus through duct 79 to the cyclones or dust filters. In some cases, agglomeration can be carried out at relatively lower humidity levels. When this is done, the formation of undesired deposits in the agglomerator is reduced. Moreover, the length of time during which the machine can be operated without the screen 90 becoming fouled is greater than that which can be achieved without the use of a boundary layer gas.

The porosity of the screens 76 and 59 can be varied to meet the requirements of the material being processed. For example, where a pressure drop ranging from about 1 p.s.i. to about 5 p.s.i. with flow rates of 5–10 cubic feet per minute per square foot of screen area is required, sintered stainless steel sheeting having openings of about 15 microns is employed. On the other hand, where the pressure drop should range from about 0 to 2 p.s.i. with flow rates ranging from 10–140 cubic feet per minute per square foot of screen, the average opening size should be about 20 microns. When the pressure drop across the screen is to remain below 0.5 p.s.i. with the flow rates of up to 160 cubic feet per minute per square foot of screen area, a sintered stainless steel screen having openings of about 35 microns can be employed.

In accordance with the present invention, the gas passed through the upper gas diffusion surface can be either relatively dry having no agglomerating characteristics or can act as a supplementary agglomerating gas by having sufficient moisture or heat to produce an agglomerating effect. If a particular material being treated requires a relatively low wet bulb temperature to be properly handled, a relatively dry gas is provided through the upper gas diffusion screen 76. If, on the other hand, a relatively high humidity is needed to promote agglomeration, then a relatively moist gas is fed through the gas diffusion screen 76.

The invention will be better understood by reference to the following examples.

*Example I*

Sodium tricalciumacetate was agglomerated in the apparatus of FIGURES 1–4. The material was first ground to a fine powder in a hammermill type grinder having a herringbone screen with .035 inch openings. The rotor of the mill was run at 5600 r.p.m.

The vibrator for the agglomerator and dryer were both operated at about 725 cycles per minute with a ⅜ inch stroke. The agglomerating atmosphere had a pressure of 12 inches of water. It consisted of a mixture of heated air and steam having a wet bulb temperature of about 185° F. and a dry bulb temperature of 720° F. The drying gas was introduced at the rate necessary to produce a pressure of 10 inches of water in the lines 77. The dry bulb temperature of the gas introduced through line 77 as well as its wet bulb temperature was the same as that of the agglomerating gas introduced through line 128.

The material being agglomerated was introduced to the agglomerator at the rate of about 150 lbs./hr. Very little of the material accumulated on the inside surface of the screen 76.

*Example II*

Spray dried tomato powder was agglomerated as in Example I except that the gas introduced through lines 128 and 77 had a wet bulb temperature of 135° F. and a dry bulb temperature of 207° F. The vibrator operated at about 750 cycles per minute with a ¾ inch stroke. After being ground in a pulverizer having a screen provided with ³⁄₁₆ inch round openings, the powdered tomato product was introduced to the agglomerator through the duct 82. Although the tomato powder because of its hygroscopic character had a tendency to plug lines and cyclones, very little product accumulation took place within the agglomerator itself. Most of the finished agglomerates ranged in size from about 2–6 mesh. The finished product exhibited excellent rehydration characteristics when added to water.

*Example III*

A dried soybean milk substitute was agglomerated as in Examples I and II with an agglomerating atmosphere consisting of a mixture of heated air and steam having a wet bulb temperature of 192° F. and a dry bulb temperature of 250° F. for both of the gas supplies. Pressure within the line 128 was .06 inch of water and that of line 77 was 0.30 inch of water. Most of the finished agglomerates ranged in size between 8 and 16 mesh.

It is apparent that many modifications and variations of this invention as hereinbefore set forth may be without departing from the spirit and scope thereof. The specific embodiments described are given by way of example only and the invention is limited only by the terms of the appended claims.

I claim:

1. An agglomerating apparatus comprising in combination an enclosure, a first foraminous gas diffusion surface defining the lower portion of the enclosure for supporting a bed of particles that are to be agglomerated, a first duct means communicating with the lower gas diffusion surface for forcing a stream of agglomerating atmosphere upwardly through the support surface, a source of a moist agglomerating gas communicating with the first duct and a second foraminous gas diffusion surface defining the upper aspect of the enclosure and a second duct means isolated from the first duct means and communicating with the upper gas diffusion surface for passing a gas through the upper gas diffusion surface into the enclosure to provide a boundary layer inside the upper portion of the agglomerator to prevent the undesired deposition of pulverulent material thereon and a source of dry gas connected to the second duct.

2. The apparatus according to claim 1 wherein a vibrator is connected to the enclosure for imparting movement thereto to maintain the particles in the bed in random motion.

3. The apparatus according to claim 1 wherein the upper gas diffusion surface comprises a dome-shaped screen composed of woven metal wire.

4. The apparatus according to claim 1 wherein the upper gas diffusion surface comprises a generally dome-shaped screen formed from sintered metal.

5. The apparatus according to claim 4 wherein the metal comprises stainless steel.

6. The apparatus according to claim 1 wherein the lower gas diffusion surface comprises a horizontally disposed flat screen, the upper gas diffusion surface comprises a dome-shaped foraminous screen, a housing surrounds the enclosure, said housing is divided into upper and lower portions and a vibrator means is connected to the housing for imparting vibration thereto to maintain the particles in the bed in random motion above the lower screen.

7. The apparatus of claim 1 wherein at least one of said surfaces comprises a porous sheet of polytetrafluoroethylene.

8. An agglomerating apparatus comprising in combination an enclosure, a first foraminous gas diffusion surface defining the lower portion of the enclosure for supporting a bed of particles that are to be agglomerated and being formed from a horizontally disposed flat element, a duct means communicating with the first gas diffusion surface for forcing a stream of agglomerating atmosphere through the support surface and a second foraminous gas diffusion surface defining the upper aspect of the enclosure, said second gas diffusion surface comprising a dome-shaped foraminous element, and a duct means communicating with the second gas diffusion surface for passing a gas through the second gas diffusion surface into the enclosure to provide a boundary layer inside the upper portion of the agglomerator to prevent undesired deposition of pulverulent material thereon, a housing surrounding the enclosure, said housing being divided into upper and lower portions and a vibrator means connected to the housing for imparting vibration thereto to maintain the particles in the bed in random motion above the lower element.

9. The apparatus according to claim 8 wherein the gas supplied through the lower element comprises a relatively humid vapor gas and the gas supplied into the enclosure through the upper gas diffusion surface comprises a relatively dry gas.

10. An apparatus for treating particulate material to promote adhesion between the surfaces of the particles being treated, said apparatus comprising in combination an enclosure, a first foraminous gas diffusion surface defining the lower portion of the enclosure for supporting a bed of the particles that are to be bonded together, said surface being formed from a substantially horizontally disposed member, duct means communicating with the first gas diffusion surface for introducing a stream of an atmosphere adapted to cause particles to be bonded to one another, a second foraminous gas diffusion surface including substantially vertically disposed porous elements extending longitudinally of the apparatus adjacent the side edges of the first surface and defining at least the side wall portions of the enclosure, said porous elements having lower edges positioned adjacent at least the side edges of the first gas diffusion surface, duct means communicating with the second gas diffusion surface for passing a gas therethrough into the area immediately above and on each side of the first gas diffusion surface to provide a boundary layer adjacent the second gas diffusion surface for preventing undesired deposition of pulverulent material on the inside surfaces of the apparatus, a housing surrounding the enclosure, said housing being divided into upper and lower portions and a means operatively associated with the apparatus for facilitating movement of the particles from one end of the apparatus to the other.

11. An apparatus for agglomerating and drying pulverulent material comprising a first housing and an independently movable second housing separate from the first housing, a duct communicating between the housings to convey agglomerates while still moist from the first housing to the second housing, upper and lower foraminous gas diffusion surfaces in each housing spaced inwardly of the top and bottom portions respectively of each housing and duct means connected to each housing to supply a gas through each of the gas diffusion surfaces into the space therebetween.

12. The apparatus of claim 11 wherein gases of different compositions are passed through the gas diffusion surfaces.

References Cited
UNITED STATES PATENTS

| | | | |
|---|---|---|---|
| 1,707,930 | 4/1929 | Bennett | 34—174 XR |
| 2,371,619 | 3/1945 | Hartley | 34—57 |
| 3,058,235 | 10/1962 | Morris et al. | 34—164 |

FREDERICK L. MATTESON, Jr., *Primary Examiner.*

A. D. HERRMANN, *Assistant Examiner.*